US010275412B2

(12) United States Patent
Ramamurthi

(10) Patent No.: US 10,275,412 B2
(45) Date of Patent: Apr. 30, 2019

(54) METHOD AND DEVICE FOR DATABASE AND STORAGE AWARE ROUTERS

(71) Applicant: Huawei Technologies Co., Ltd., Shenzhen, Guangdong (CN)

(72) Inventor: Prasanna Venkatesh Ramamurthi, Bangalore (IN)

(73) Assignee: Huawei Technologies Co., Ltd., Shenzhen (CN)

( * ) Notice: Subject to any disclaimer, the term of this patent is extended or adjusted under 35 U.S.C. 154(b) by 312 days.

(21) Appl. No.: 15/148,910

(22) Filed: May 6, 2016

(65) Prior Publication Data

US 2016/0321341 A1 Nov. 3, 2016

Related U.S. Application Data

(63) Continuation of application No. PCT/CN2014/076844, filed on May 6, 2014.

(30) Foreign Application Priority Data

Nov. 8, 2013 (IN) .......................... 5044/CHE/2013

(51) Int. Cl.
*G06F 15/173* (2006.01)
*G06F 16/27* (2019.01)
(Continued)

(52) U.S. Cl.
CPC ........ *G06F 16/275* (2019.01); *G06F 11/1471* (2013.01); *H04L 45/02* (2013.01);
(Continued)

(58) Field of Classification Search
CPC ......... H04L 45/00; H04L 45/02; H04L 45/04; H04L 45/06; H04L 45/24; H04L 45/28;
(Continued)

(56) References Cited

U.S. PATENT DOCUMENTS 6,331,983 B1 12/2001 Haggerty et al.
6,889,297 B2 5/2005 Krapp et al.
(Continued)

FOREIGN PATENT DOCUMENTS

CN 101729365 A 6/2010
CN 101986628 A 3/2011
(Continued)

OTHER PUBLICATIONS

A. B. Roach, "Session Initiation Protocol (SIP)—Specific Event Notification", Network Working Group, Jun. 2002, 34 pages.
(Continued)

*Primary Examiner* — Farzana B Huq

(57) ABSTRACT

A method and system for optimizing replication in a distributed network is described. The instant invention allows for determining existing cluster topology of the network by one or more router(s) device(s) operating in the network, identifying and optimizing a data replication stream/service in use in network, by said router(s); determining a routing scheme based on the cluster topology by the router routing data packets though said network based on said routing scheme and applying predefined policy to a predefined set of router(s) corresponding to identified data replication stream by the router.

13 Claims, 8 Drawing Sheets

(51) Int. Cl.
*G06F 11/14* (2006.01)
*H04L 12/751* (2013.01)
*H04L 12/741* (2013.01)
*H04L 29/08* (2006.01)
*G06F 11/20* (2006.01)
*H04L 12/18* (2006.01)

(52) U.S. Cl.
CPC ........ *H04L 45/745* (2013.01); *H04L 67/1095* (2013.01); *H04L 67/2842* (2013.01); *G06F 11/2094* (2013.01); *G06F 2201/80* (2013.01); *H04L 12/18* (2013.01)

(58) Field of Classification Search
CPC ......... H04L 45/34; H04L 45/42; H04L 45/46; H04L 45/54; H04L 45/742; H04L 29/06027; H04L 65/4076; H04L 49/25; H04L 49/26; H04L 49/36; H04L 49/356; H04L 45/745; H04L 67/1095; H04L 67/2842; H04L 12/18; G06F 17/30581; G06F 11/1471; G06F 2201/80; G06F 11/2094
USPC ....................................................... 709/238
See application file for complete search history.

(56) References Cited

U.S. PATENT DOCUMENTS

| | | | | |
|---|---|---|---|---|
| 6,915,309 | B1* | 7/2005 | Conley | ................... H04L 41/12 |
| 7,609,619 | B2 | 10/2009 | Naseh et al. | |
| 7,751,405 | B1 | 7/2010 | Kompella | |
| 7,792,987 | B1 | 9/2010 | Vohra et al. | |
| 7,834,784 | B1 | 11/2010 | Zhang et al. | |
| 7,836,053 | B2 | 11/2010 | Naef, III | |
| 7,849,199 | B2 | 12/2010 | Schulz et al. | |
| 2005/0117558 | A1 | 6/2005 | Angermann et al. | |
| 2005/0122955 | A1* | 6/2005 | Lin | ......................... H04L 45/04 370/351 |
| 2005/0198351 | A1 | 9/2005 | Nog et al. | |
| 2007/0183346 | A1* | 8/2007 | Thubert | ................. H04L 45/04 370/254 |
| 2010/0318632 | A1 | 12/2010 | Yoo et al. | |
| 2011/0196828 | A1 | 8/2011 | Drobychev et al. | |
| 2012/0054533 | A1 | 3/2012 | Shi et al. | |
| 2012/0151164 | A1 | 6/2012 | Nayak | |
| 2012/0226799 | A1 | 9/2012 | Kapur et al. | |
| 2013/0016612 | A1* | 1/2013 | Vasseur | ................... H04L 45/48 370/235 |
| 2013/0176843 | A1* | 7/2013 | Cole | ....................... H04L 45/00 370/218 |
| 2014/0204761 | A1* | 7/2014 | Durrani | .................. H04L 47/41 370/236 |
| 2015/0256488 | A1* | 9/2015 | Cole | ....................... H04L 45/00 370/218 |

FOREIGN PATENT DOCUMENTS

| | | |
|---|---|---|
| CN | 102223284 A | 10/2011 |
| CN | 103384988 A | 11/2013 |
| EP | 1538804 A1 | 6/2005 |
| WO | 2009/124002 A1 | 10/2009 |

OTHER PUBLICATIONS

K. Patel et al., "Service Advertisement using BGP, draft-keyupate-bgp-services-01.txt", Network Working Group, Oct. 2012, 12 pages.
T. Bates et al., "Multiprotocol Extensions for BGP-4", Network Working Group, Jan. 2007, 12 pages.
Y. Rekhter, Ed. et al., "A Border Gateway Protocol 4 (BGP-4)", Network Working Group, Jan. 2006, 104 pages.
Ashok Anand et al., "SmartRE: An Architecture for Coordinated Network-wide Redundancy Elimination", SIGCOMM '09, Aug. 17-21, 2009, 12 pages.
Neil T. Spring et al., "A Protocol-Independent Technique for Eliminating Redundant Network Traffic", 9 pages.
Bhavish Aggarwal et al., "EndRE: An End-System Redundancy Elimination Service for Enterprises", 14 pages.
Ashok Anand et al., "Packet Caches on Routers: The Implications of Universal Redundant Traffic Elimination", SIGCOMM'08, Aug. 17-22, 2008, 12 pages.
Navendu Jain et al., "TAPER: Tiered Approach for Eliminating Redundancy in Replica Synchronization", FAST '05: 4th USENIX Conference on File and Storage Technologies, p. 281-294.
Sumanta Saha, "On Reducing the Processing Load of Redundancy Elimination Algorithms", Joint Workshop of SCPA 2011 and SaCoNAS 2011, p. 1106-1110.
"Cisco Service Advertisement Framework Fundamentals", Cisco, Sep. 24, 2010, 9 pages.
"Congestion Management and Buffering in Data Center Networks", Extreme Networks White Paper, 11 pages.

* cited by examiner

ADVERTISEMENT AND SUBSCRIPTION BY MDER MASTER DB NODE EDGE ROUTER IN A DISTRIBUTED NETWORK ENVIRONMENT

EXEMPLARY HARDWARE ARCHITECTURE OF ROUTER DEVICE(S) AND DATABASE NODES

METHOD AND DEVICE FOR DATABASE AND STORAGE AWARE ROUTERS

CROSS-REFERENCE TO RELATED APPLICATIONS

This application is a continuation of International Application No. PCT/CN2014/076844, filed on May 6, 2014, which claims priority to Indian Patent Application No. IN5044/CHE/2013 filed on Nov. 8, 2013, both of which are hereby incorporated by reference in their entireties.

TECHNICAL FIELD

The present disclosure relate to devices and associated methods for maintaining distributed storage in a network environment, and more specifically, but not limited to, a system and method for optimizing the distributed storage network environment.

BACKGROUND

Distributed storage is one of the foremost critical requirement for the enterprises today. The data is maintained across geographies and dedicated systems are maintained which ensure redundancy across the geographies.

One of the foremost reasons for having a distributed architecture include, but not limited to, extremely large volumes of data, to make programs scalable and take advantage of multiple systems as well as multi-core CPU architectures. On the other end, website servers need to be globally distributed for low latency and failover and so on.

In a typical scenario, System administrators can distribute collections of data (e.g., in a database) across multiple physical locations. A distributed database can reside on network servers on the Internet, on corporate intranets, or on other company networks. As distributed databases store data across multiple computers, they improve performance at end-user by allowing transactions to be processed on many machines, instead of being limited to one.

A distributed storage within the purview of the current invention may refer to a computer network where information is stored on more than one network node, e.g., in a replicated fashion. Thus, it may also refer to either a distributed database where users store information on a number of network nodes, or a computer network in which users store information on a number of peer network nodes.

A person ordinary skilled in the art may very well know that in communication networks, a node may refer to a connection point, either a redistribution point or a communication endpoint (e.g., some terminal equipment). A physical network node is an active electronic device that is attached to a network, and is capable of sending, receiving, or forwarding information (e.g., data packets) over a communications channel.

Traditionally replication involves utilizing specialized software modules that look for changes in the distributive database. Once the changes have been identified, the replication process makes all the databases look the same, i.e., contain similar data. The replication process can be tediously complex and time-consuming depending on the size and number of the distributed databases. This process also requires a lot of computer resources.

Thus, there is a long felt need to optimize the database replication in order to save precious network resources including memory, CPU cycles etc.

A lot of solutions have been proposed to reduce the wastage of network resources due the replication of data on multiple nodes in a network. However, existing solutions either operate on the application level with the cluster topology awareness or operate on the router level (L2/L3) without database cluster topology awareness.

Solutions based merely on "router level" methodology suffer from multiple drawbacks including but not limited to redundancy in the network due to over subscription on the master node side. Redundancy elimination techniques are themselves costly and applied uniformly without any consideration to the nature of the information, i.e., are not context specific.

Without the knowledge of the underlying database topology either additional content are cached or the caches are not used optimally.

Further, traditional solutions are not able to offer any policy for various contents based on database content. For example, such solutions cannot be used to implement, e.g., a special path which tries to maximize the MTU (Maximum Transmitting Unit) for initial mirroring information.

Thus, there is a long felt need to provide an optimized method and system for distributed storage that avoids said and many other disadvantages exhibited by the conventional approaches. Particularly, an optimized method and system for distributed storage is required that can work in any data storage solution or any database and that which works optimally irrespective of the replication mechanism being used. Such a solution should be cost effective and preferably use existing router infrastructure (like MPLS, MPLS-TE, CSPF) to achieve the desired improvement.

SUMMARY

For purposes of summarizing, certain aspects, advantages, and novel features of the disclosure have been described herein. It is to be understood that not necessarily all such advantages may be achieved in accordance with any one particular embodiment of the disclosure. Thus, the present disclosure may be embodied or carried out in a manner that achieves or optimizes one advantage or group of advantages as taught herein without necessarily achieving other advantages as may be taught suggested herein.

The present invention with an objective to obviate above mentioned and many other disadvantages provides a method and system for optimizing the storage and database replication by making the storage/database routers aware of the underlying data storage/database cluster topology and replication streams.

The system and corresponding method in a typical embodiment of the instant invention offers a mechanism for the routers with minimal configuration from the user to determine the nature of the storage/database replication topology and then using the topology awareness, the routers are equipped to optimize the data storage/database replication streams.

An embodiment of the invention provides a determination of the cluster topology of the underlying network by a router.

A method and system for optimizing replication in a distributed network environment configured for hosting and communicating among plurality of data packets and a database [server], comprises of determining existing cluster topology of the network environment by one or more router(s) device(s) operating in the network; Identifying and optimizing a data replication stream/service in use in network environment, by said router(s); determining a routing scheme based on the cluster topology by the router routing data packets though said network environment based on said routing scheme; applying predefined policy to a predefined set of router(s) corresponding to identified data replication stream by the router.

In another embodiment of the instant invention router(s) determine existing cluster topology of the network environment using a set of edge router(s) and an edge router operating closest to said database server is a database node edge router.

In another embodiment of the instant invention, database node edge router contains configured data comprising of Internet Protocol Address of database node edge router, Data base cluster unique identifier, Channel and associated policy configurations.

In yet another embodiment of the present invention, master edge router optimizes data replication stream by enabling caching on edge router(s) and attaching a finger print to a payload associated with the cache.

In yet another embodiment of the instant invention, routing of data packets within the context of the instant invention comprises creating a path along with a label by a first router for routing a data packet to a third router using cached data of a second router, determining by the first router that a data packet to be transmitted to third router is cached in the second router and using a cached fingerprint along with the path label; receiving by the second router the fingerprint with corresponding label, processing the received packet data, converting the packet data with actual data and forwarding the actual data towards third router.

In another embodiment of the present invention, the method and system is configured for advertising/publishing the identified data replication stream/service by the edge router in the network environment, receiving and storing the advertised/published information by a database-aware router, subscribing to a master database edge router by the database-aware router, adding the database-aware router in a cluster as a SDER (Subscription Database Edge Router) after said subscription, configuring the corresponding SDER (Subscription Database Edge Router) for each added database-aware router, wherein master database edge router (MDER) on receiving a subscription request is configured for checking if requesting database-aware router or SDER is already subscribed, enabling caching on MDER-SDER link after determining that requesting database-aware router or SDER is already subscribed.

In yet another embodiment of the instant invention, the method and system are configured for sending a REDO log information as data packets to a subscriber node by its corresponding master DB node, intercepting said packet data by MDER (master database edge router) for determining REDO log information, caching said packet data after determining that it contains REDO log information and that cache is not already enabled.

In yet another embodiment of the instant invention, the method and system are configured for extracting destination address of a data packet by master database edge router via a lookup edge router information, generating a fingerprint for the packet data for cache enabled edge router and storing and forwarding fingerprint data and packet, labeling the packet data and forwarding finger print and generating a label by master database edge router for the packet data and forwarding only finger print when it is determined that a fingerprint already exists.

In another embodiment of the present invention a master database edge router based on a determined topology of a DB cluster exhibits an optimal utilization of caching.

In another embodiment of the invention, the present invention provides for optimization of a replication streams OR a redo stream by a plurality of routers.

In yet another embodiment of the present invention, a methodology for routing and caching packets is described.

The present disclosure in an embodiment of the invention provides a system (and a method) applying specific policies for different nature of streams expressed in terms of the DB (Database operations).

All the embodiments as herein described with respect to the present invention are applicable to the method and the corresponding system.

These and other embodiments of the present disclosure will also become readily apparent to those skilled in the art from the following detailed description of the embodiments having reference to the attached figures, the disclosure not being limited to any particular embodiments disclosed.

BRIEF DESCRIPTION OF THE DRAWINGS

For a better understanding of the embodiments of the systems and methods described herein, and to show more clearly how they may be carried into effect, reference will now be made, byway of example, to the accompanying drawings, wherein.

DETAILED DESCRIPTION

Figure 1:
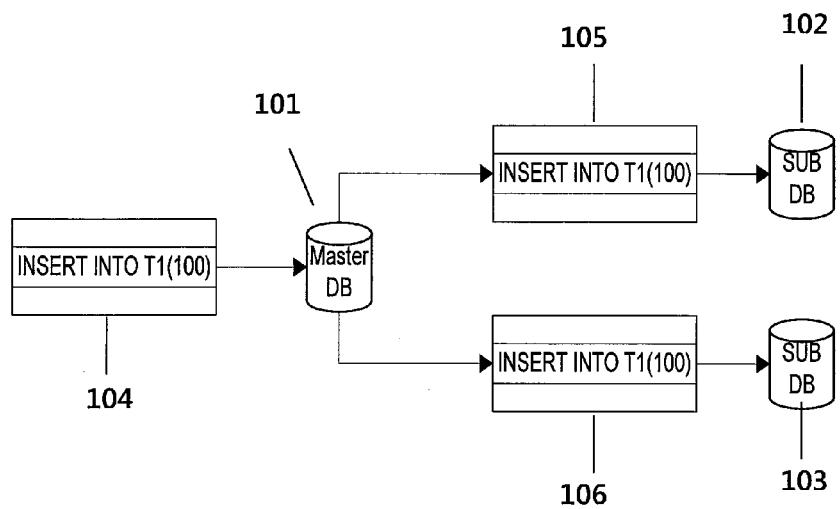
FIG. 1 illustrates an existing Single Master Replication mechanism.

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Figures depict a simplified structure only showing some elements and functional entities, all being logical units whose implementation may differ from what is shown. The connections shown are logical connections; the actual physical connections may be different. It is apparent to a person skilled in the art that the structure may also comprise other functions and structures. It should be appreciated that the functions, structures, elements and the protocols used in communication are irrelevant to the present disclosure. Therefore, they need not be discussed in more detail here.

Also, all logical units described and depicted in the figures include the software and/or hardware components required for the unit to function. Further, each unit may comprise within itself one or more components which are implicitly understood. These components may be operatively coupled to each other and be configured to communicate with each other to perform the function of the said unit.

The features provided by the disclosed system in the present disclosure, may be wirelessly accessed remotely, in one or more embodiments, and/or through a wireless network. Such types of wireless network service providers operate and maintain the computing systems and environment, such as server system and architectures. Typically, server architecture includes the infrastructure (e.g., hardware, software, and communication lines) that offers wireless network services. The operations in embodiment of the present invention may in certain embodiments are performed wirelessly during on-air or air interface.

For the most part, the operations described herein are operations performed by a network, device, computer or a machine, or in some embodiments in conjunction with a human operator or user that interacts with the computer or the machine. The programs, modules, processes, methods, data, and the like, described herein are but an exemplary implementation and are not related, or limited, to any particular computer, apparatus, or computer language. Rather, various types of general purpose computing machines or devices may be used with programs constructed in accordance with the teachings described herein.

It should be understood that embodiments of the present disclosure may be included in various types of communication networks intended to be within the scope of the present disclosure, although not limited to, embodiments The terms "network" and "systems" are often used interchangeably.

Now, the instant mechanism advantageously provides a mechanism for a given set of edge routers to determine DataBase cluster topology given some minimal configuration. The edge routers are closest to a master DB (DataBase) node as the "Master DB Node Edge Router" or shortly "MDER". The MDER is configured when a cluster comprising of a plurality of network nodes, e.g., routers is being created. The router may offer CLI (Command Line Interface) or SNMP (Simple Network Management Protocol) or other configuration mechanisms to enable this configuration. The data configured in the MDER comprise:

a. A Master DB (DataBase) node IP address
  b. A DataBase cluster unique identifier
  c. Channel and associated policy configurations Thus, the edge routers within the purview of the instant invention are configured to detect the topology of data storage networks, replicated database cluster, distributed databases and distributed data storage.

As known, a router is a device that forwards data packets between computer networks, creating an overlay internetwork. A router may be typically connected to two or more data lines from different networks. When a data packet comes in one of the lines, the router reads the address information in the packet to determine its destination. Then, using information in its routing table or routing policy, it directs the packet to the next network on its journey. Thus, routers perform the "traffic directing" functions on the Internet.

A person ordinary skilled in the art within the purview of the instant invention may note that a cluster within the purview of the instant invention consists of a set of loosely connected or tightly connected computers that work together so and are typically viewed as a single system.

Now, once a cluster is configured, the MDER uses a suitable advertisement/publication mechanism to advertise/publish this service across the network. One of the advertisement ways is using the BGP (Border Gateway Protocol) advertisement/publication mechanism introduced in IETF (Internet Engineering Task Force) draft "draft-keyupate-bgp-services-02".

The present invention also provides a framework for service advertisement/publishing and the same is described in detail via later paragraphs.

For the sake of clarity and for effectively appreciating the technical contribution of the instant invention, few existing proposed solutions are provided herewith that are briefly described with reference to drawings.

FIG. 1 illustrates an existing Single Master Replication mechanism. Herein, a transaction (104) made to a Master Database (101) is propagated to a subscriber database (102) and a subscriber database (103) via transactions (105) and (106) respectively. Thus, redundant copies are maintained at subscriber databases (102) (103).

Figure 2:
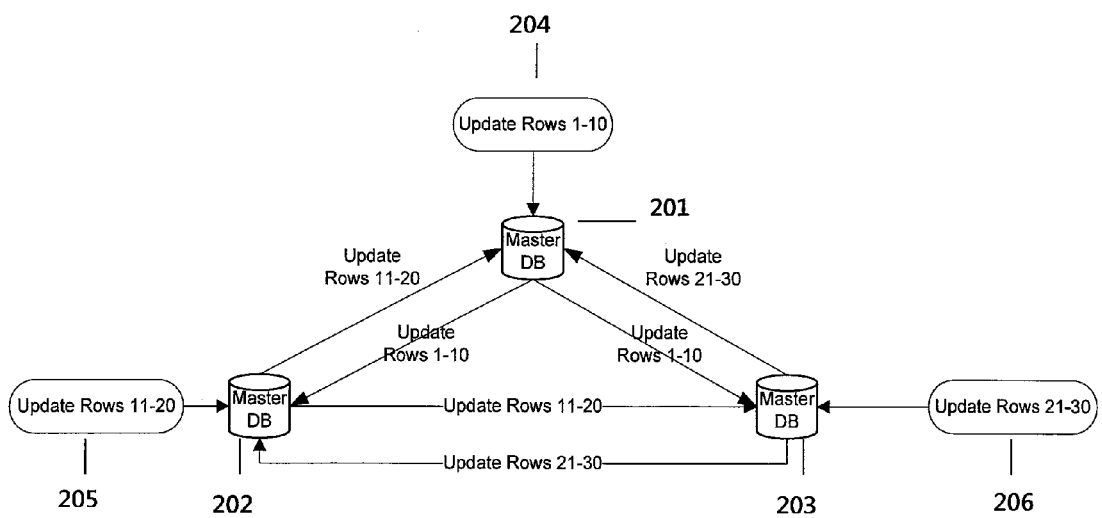
FIG. 2 illustrates an existing Multi-master replication.

FIG. 2 illustrates an existing Multi-master replication mechanism. Here, multiple master databases (201, 202, 203) are maintained that may be updated simultaneously and independently. Any update made to a particular Master Database needs to be propagated to remaining Master databases for consistency. E.g. Master Database (201) when updated with a transaction (204) propagates the updates to remaining Master Databases (202, 203). Same holds true for remaining master databases which propagate their updates to all other Master databases.

Figure 3:
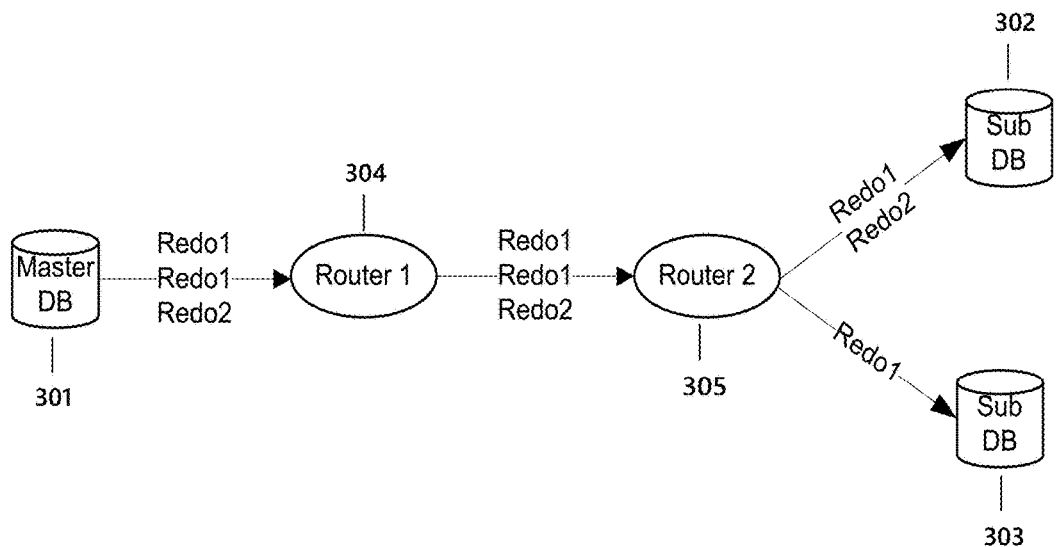
FIG. 3 illustrates Redundancy in Traditional Replication.

FIG. 3 illustrates redundancy in an existing/traditional replication. Here Master Database (301) has two subscriber databases (302, 303). Any change/update made to Master Database (301) needs to be propagated to all its subscribers (302, 303). Therefore, whenever an update is made to Master Database (301), the Master Database (301) serves two copies of the update to subscriber database (302) and subscriber database (303). The two copies are propagated within distributed network via a no. of intermediate routers. A copy of update made to Master Database is therefore repeated at each router for delivery to subscriber databases (302 and 303) using precious network resources and increasing redundancy manifold.

Thus, again redundancy in the distributed network environment is maintained.

Figure 4:
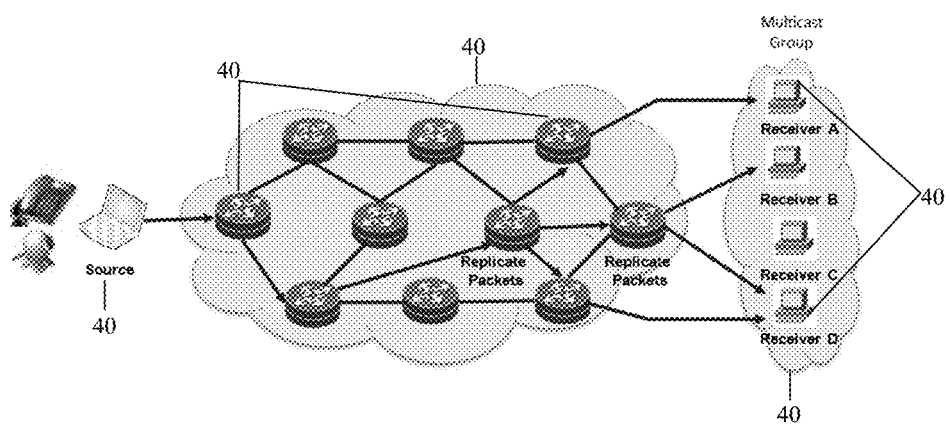
FIG. 4 illustrates a diagrammatic representation of an existing Multicast solution for Solving over-subscription in a distributed network environment.

FIG. 4 illustrates a diagrammatic representation of an existing Multicast solution For Solving Over-subscription in a distributed network environment.

As of now attempts to avoid redundancy in existing distributed networks, include solving the data routing problem and focusing on database replication. Only part solutions have been proposed. These could be categorized as:

Attempts to reduce over-subscription and redundancy in the network; and

Figure 5:
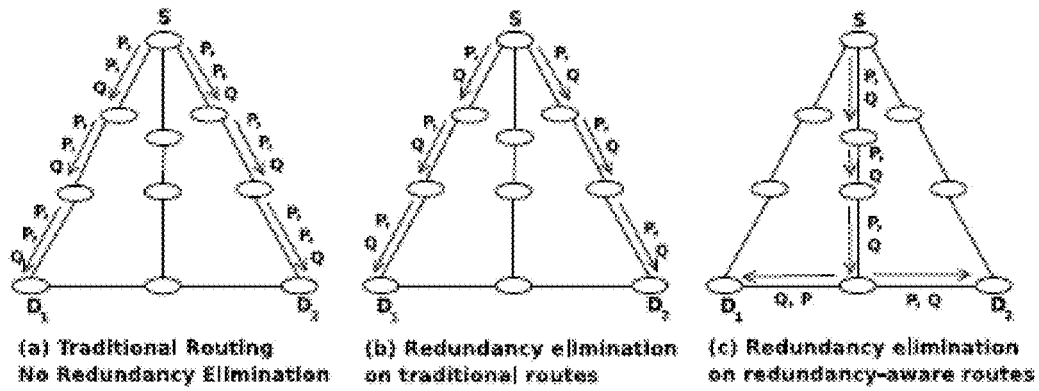
FIG. 5 illustrates a diagrammatic representation of an existing solution for redundancy elimination.

Attempts on content specific routing;

FIG. 5 illustrates a diagrammatic representation of an existing solution for Redundancy elimination.

Figure 6:
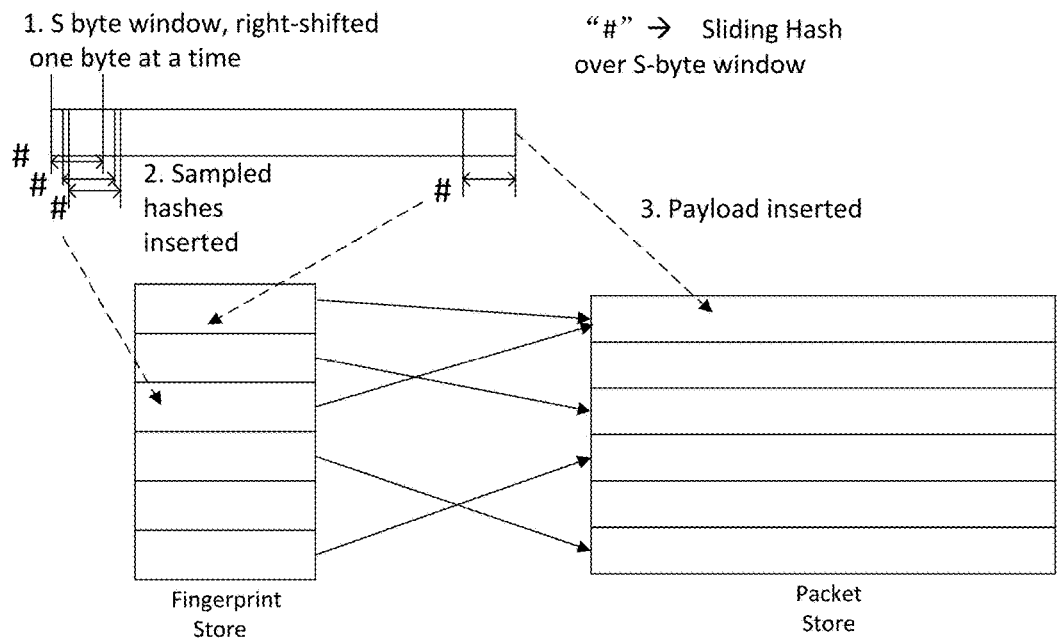
FIG. 6 illustrates a diagrammatic representation of an existing solution for Packet Level Redundancy Detection.

Similarly, FIG. 6 illustrates an existing solution for Packet Level Redundancy Detection.

However, when applied to general database replication optimization these solutions (e.g., as diagrammatically represented in FIG. 5 and FIG. 6) suffer disadvantages including but not limited to High computational cost as they attempt to reduce redundancy at "byte" level and therefore tend to increase the load the edge routers tremendously Said solutions do not make use of nature of data transmitted as they apply uniform optimization across all data which is sub-optimal in actual distributed network environment As Topology of the database cluster is not known they cannot offer database-aware routing solutions The basic solution to avoid over-subscription is the usage of multicast solutions. However, multicast solutions are available only for UDP (User Datagram Protocol). Most of the replication implementations are based on TCP (Transmission Control Protocol) which do not have optimal multicast solutions. The UDP (User Datagram Protocol) multicast solutions also suffer from lack of reliability. Also to use multicast solutions require a lot of change in DataBase implementations which make the solutions more complex.

Figure 7:
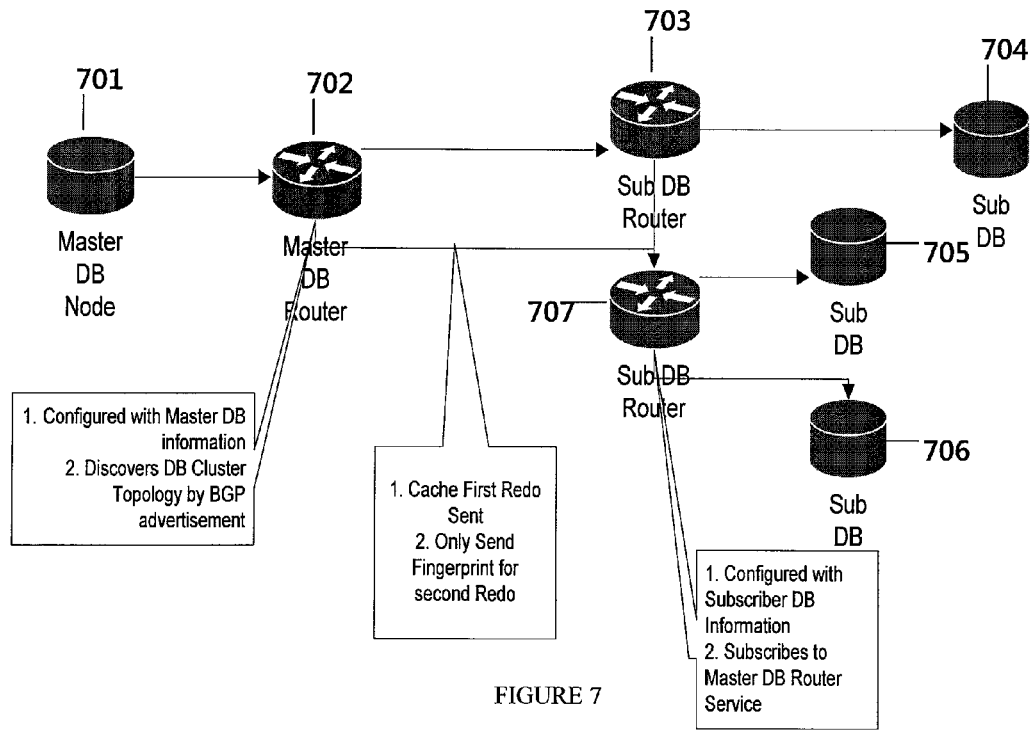
FIG. 7 illustrates an exemplary distributed/replication database.

FIG. 7 illustrates an exemplary distributed/replication database of the instant invention.

One of the many primary aspect of the invention deals with the determination of a cluster topology by a router operating in the distributed network environment of the instant invention. Such determination may utilize existing mechanisms standardized by IETF (Internet Engineering Task Force), e.g. including but not limited to "Service Advertisement Using BGP (Border Gateway Protocol), draft-keyupate-bgp-services-02".

Using mechanisms as mentioned above, the instant invention allows a router to advertise (i.e., publish) a service using BGP protocol. Thus, instant invention in a typical embodiment uses this mechanism to publish a DataBase Replication Service. This mechanism as mentioned is merely an exemplary mechanism used to advertise in line with the objectives of the present invention.

Thereafter, an edge router which is closest to a "Master DB node" is configured with the database replication information. On this configuration using BGP (or other suitable mechanism) the router advertises/publishes this service across the whole distributed network.

Similarly, when a subscriber DataBase node is added to this cluster, the edge router which is closest to this node is also configured marking the role as a subscriber. Based on this configuration the router subscribes to the Master DataBase router. By this mechanism the routers are able to understand the underlying DataBase cluster topology.

Another aspect of the instant invention deals with the optimization of replication streams (e.g., a redo stream needs to be optimized in case of a database replication) by the routers.

As mentioned in the background section of this document, there is a lot of redundant data which exists in a multi-subscriber DB (DataBase) cluster. The same data is being repeated for each subscriber DataBase (DB). The master DataBase (DB) node edge router optimizes this by enabling caching on edge routers which have more than one subscriber DataBase (DB) attached. Then for further transmissions of the same data a copy from the cache is used. The key observation point which is used in the current invention is the fact that in a redo stream, traditionally; the whole packed is retransmitted as many times as there are subscribers in the network environment. Using this mechanism, the master DB (DataBase) node edge router need not use "sliding window" caching techniques (like Rabin's fingerprint), but can use a fixed payload cache like MD5. Then the finger print is attached to the payload and this is synchronized across the routers.

Essentially there is selective and automatic enablement of caching on various router-router links.

With reference to FIG. 7, a Master DB Node (701) maintains a master copy of the database. The Master DB Node (701) is accessible via a Master DB Router (702). The Master DB router (702) is specifically configured with Master DB information. Also, Master DB router (702) is further configurable to discover DB cluster topology using BGP advertisement.

The Master DB router (702), in effect, caches first REDO sent but advantageously sends a fingerprint for second REDO thereby saving precious network resources.

Further, subscriber DB routers (703) (707) are configured for subscriber DB information. The subscriber DB routers (703) (707) subscribe to Master DB router service.

Figure 8:
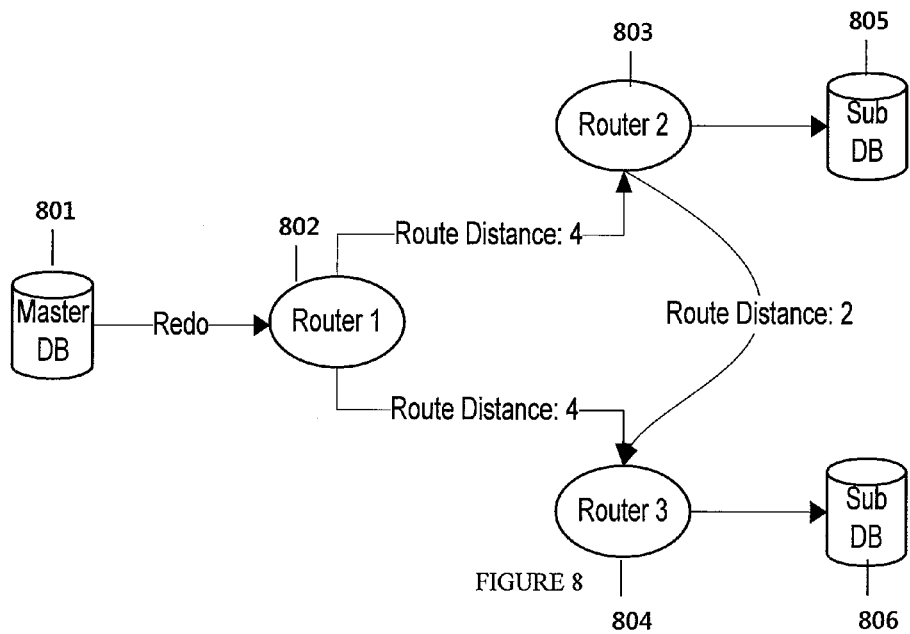
FIG. 8 illustrates an optimal Routing methodology based on Caching and Topology Awareness.

FIG. 8 illustrates an optimal Routing methodology based on Caching and Topology Awareness.

This aspect of the invention relates with the routing concepts for different topologies. One of the typical topologies is a multi-master DataBase cluster. As an exemplary embodiment, there may be 3 nodes in a DataBase cluster, with all of them write enabled. Now, each change in every node is to be synchronized across the remaining two nodes to keep consistency of the underlying distributed network environment. The distributed network environment may adopt any of existing "Mesh" or a "star" schema.

In either of the schemas, the combination of caches and the recalculation of routes based on these caches are proposed in line with the objectives of the present invention.

Irrespective of the underlying topology, when there are more than one subscriber, but each subscriber is attached to a different edge-router, a simple caching technique will not suffice.

In such a scenario us aptly illustrated in FIG. 8, along with the caching technique it is required that the data packets are also routed appropriately. Thus when the master DB node router identifies the topology of the DB cluster to be of the above said nature, it computes the path to each node. Based on this computation the DB cluster establishes paths across the network which can use caching. The paths, in exemplary embodiments, could be established by RSVP-TE (Resource Reservation Protocol-Traffic Engineering) or MPLS-TE mechanisms.

Now this embodiment of the invention dealing with the actual routing of packets and caching is some specialized conditions, is depicted in the FIG. 8. Typically, the Router-1 creates a path along with a label for routing to Router-3 using cached data in Router-2 and vice-versa.

When the Router-1 determines a packet is cached in Router-2, but it has to be now transmitted to Router-3, it uses the cached fingerprint along with this path label. Router-2 on receiving the finger-print with the specific label, processes the packet and converts the packet data with the actual data and then forwards it to Router-3.

This technical feature essentially saves "2 units of distance" which is otherwise redundant data.

Another embodiment of the inventions deals with applying specific policies for different nature of streams expressed in terms of the DB operations, e.g., like a "REDO stream", "Full Mirror stream", "Priority Stream".

The DataBase aware router is configured with various connection parameters along with policies. One exemplary embodiment includes a connection for an initial mirroring stream with maximum MTU {Maximum Transmission Unit} and compression. The DataBase aware router creates a label switched path using the policies mentioned. Such a label switched path is implemented via CSPF and LDP. On a stream transmission, the master DataBase node edge router determines the nature of the stream and applies appropriate policies.

Essentially, a maximum MTU (Maximum Transmission Unit) path on router configuration is created allowing for routing initial mirror (complete synchronization) packets on this path.

Figure 9:
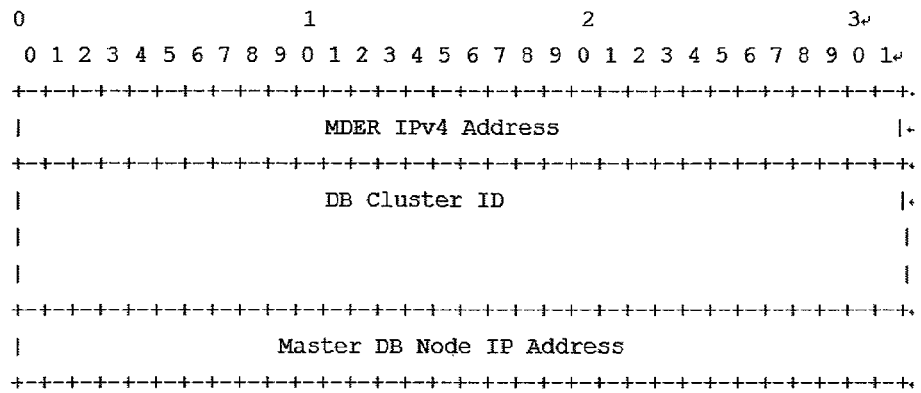
FIG. 9 illustrates data configured in an exemplary MDER (Master DB Node Edge Router)

FIG. 9 illustrates data configured in an exemplary MDER (Master DB Node Edge Router)

Figure 10:
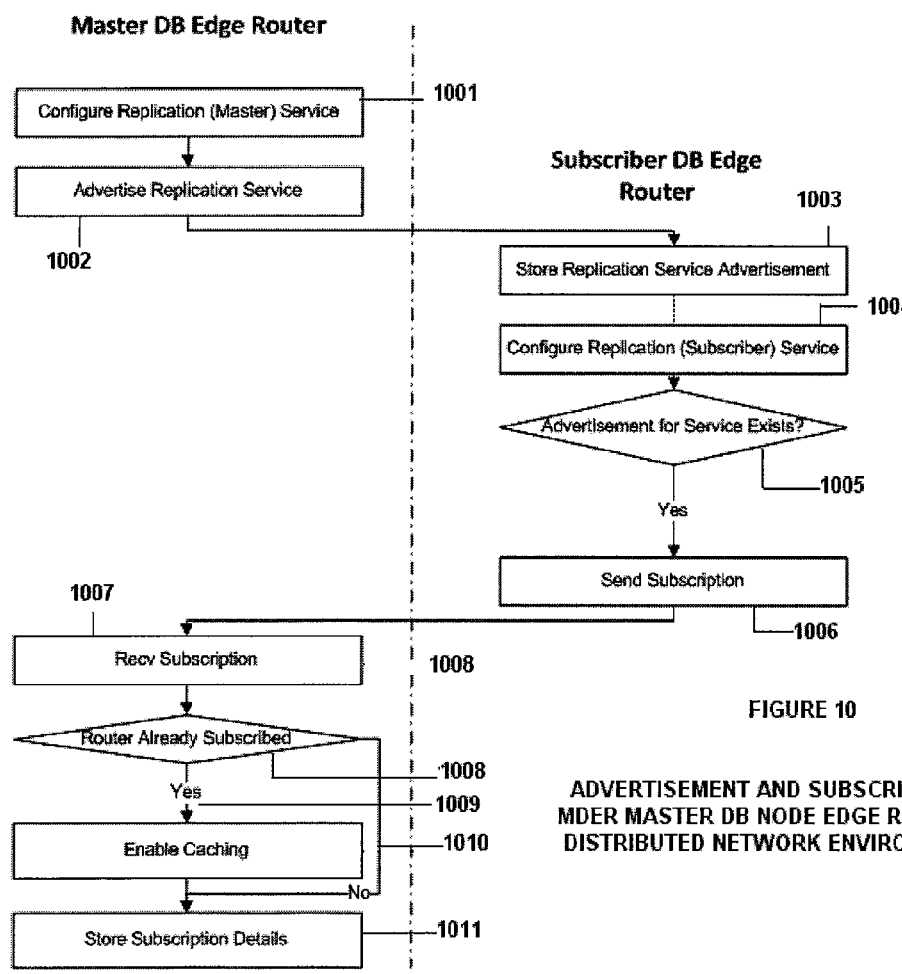
FIG. 10 illustrates a flow diagram depicting Advertisement and Subscription by MDER (Master DB Node Edge Router) in a distributed network environment.

FIG. 10 illustrates a flow diagram depicting Advertisement and Subscription by MDER (Master DB Node Edge Router) in a distributed network environment The Advertisement and Subscription by the MDER in line with the present invention includes, but not limited to, following steps.

Initially, the MDER (Master DB Node Edge Router) on configuration with a replication service advertises the service to the whole distributed network. Any router DB-aware router receives this advertisement and stores the advertisement information. When the DB-aware router is configured for subscriber information and the corresponding cluster information the DB-aware router subscribes to the MDER for the subscription service. Now this node becomes the SDER (Subscriber DataBase Edge Router). The subscription in exemplary embodiments can be handled by one of the subscription protocols like XMPP, Jabber or SIP Presence (RFC-3265).

For each subscriber DB node added to a cluster, the corresponding SDER (Subscriber DataBase Edge Router) is configured and it subscribes for the service. Hence if an SDER (Subscriber DataBase Edge Router), in an embodiment, is configured with two subscriber DB nodes, it will subscribe twice for the service. The MDER on receiving a subscription checks if this SDER has already subscribed. If this SDER has already subscribed to the service, then the MDER enables cache on this MDER-SDER link.

In another embodiment the master DataBase sends REDO log information to its subscriber. The MDER is aware of the concept of REDO logs. The MDER intercepts the packet from the master DB node and tries to determine if this packet is a REDO log packet. The determination in a typical embodiment may be achieved by configuration of IP no. and Port No.

Here a specific (originating IP+Destination IP+Destination Port) could also be associated with a channel and the channel could be associated with REDO log policy. Alternatively the MDER could be equipped with the packet format of a REDO message and by using DPI (Deep Packet Inspection) techniques could determine the nature of the packet. Thus, determination of the nature of data replication traffic stream by the routers and selective application of policy is one of the key technical feature(s) of the instant invention.

Now, advertisement and subscription steps are explained with respect to FIG. 10. A replication (Master) Service is configured at Master DB Edge Router (1001). Thereafter, replication service is advertised/published (1002) by Master DB Edge Router. The corresponding Subscriber DB Edge Router stores replication service advertisement (1003) and configures replication (subscriber) service (1004).

Thereafter, Subscriber DB Edge Router determines whether an advertisement/publication for such a service already exists. If the advertisement for service exists, a subscription is sent by Subscriber DB Edge Router and the subscription is received (1007) at the Master DB Edge Router.

The Master DB Edge Router on receiving said subscription (1007) determines if the router is already subscribed (1008) and if so, enables caching (1009) and then stores subscription details (1011). In case Router is not already subscribed, subscription details are stored (1011) (without enabling caching).

Figure 11:
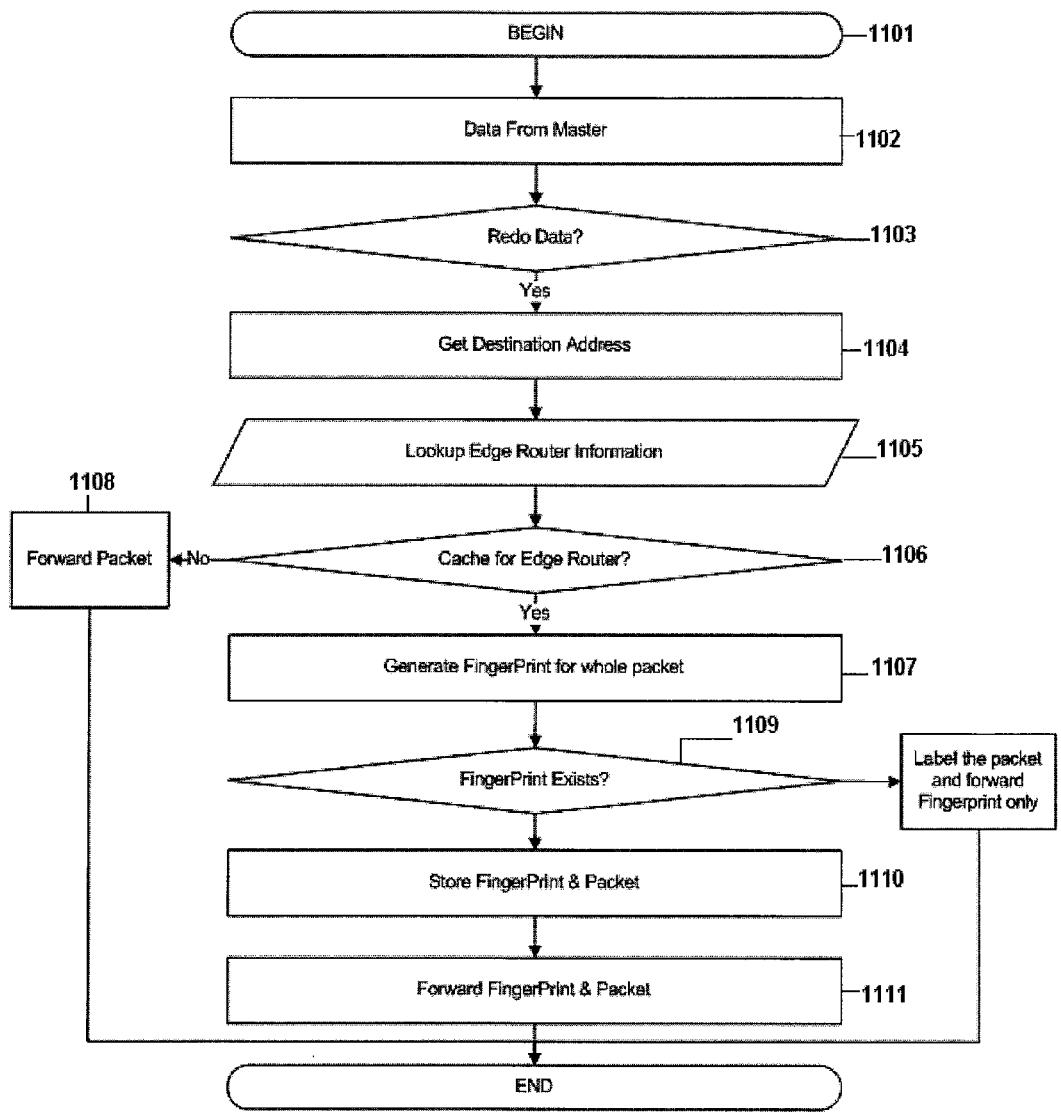
FIG. 11 illustrates a flow diagram depicting REDO Caching Optimization.

FIG. 11 illustrates a flow diagram depicting REDO Caching Optimization.

Here, once the MDER determines the packet is a REDO packet, the MDER tries to cache it optimally. If more than one Subscriber node exists in this MDER-SDER path, this packet is sure to repeat. The MDER checks if cache is enabled on this MDER-SDER path. If enabled the MDER proceeds to handle the packet as described in the above flow chart. Another key point to note is that for cached packets, the packet is labeled. This label could be pre-negotiated with the SDER or statically configured with the SDER/MDER. Once the SDER receives a packet with this label, it will convert the fingerprint to the actual packet and forward the actual packet to the subscriber. It may be required that the TCP streams between Master-S1 and Master-S2 are periodically reconciled. If not reconciled, the streams may have an offset because of network conditions and the caching will fail.

With reference to FIG. 11, a MDER determines whether data packet received (1102) from a Master DataBase is REDO Data (1103). In case the received data is REDO data, destination address is extracted from the data packet and matched with a lookup edge router information (1105). In case it is determined that data packet is not already cached for the Edge Router, the data packet is forwarded (1108).

Otherwise, in case the data packet is already cached for the Edge Router, a fingerprint is generated for the whole packet (1107). In case a fingerprint already exists (1109), the finger print and data packet are stored (1110) and both are forwarded (1111).

In case, fingerprint does not already exist, packet data is labeled and only fingerprint is forwarded.

Fingerprinting a data packet within the purview of the instant invention is a method of creating a unique key using the characteristics of the packet, through which the packet can be uniquely determined in the cache.

Thus, Optimistic caching a IP packet/data packet is based on the enablement of cache. The caching is performed for physical replication logs (REDO in case of DB) as well as for logical replication logs (SQL in case of DB)

Figure 12:
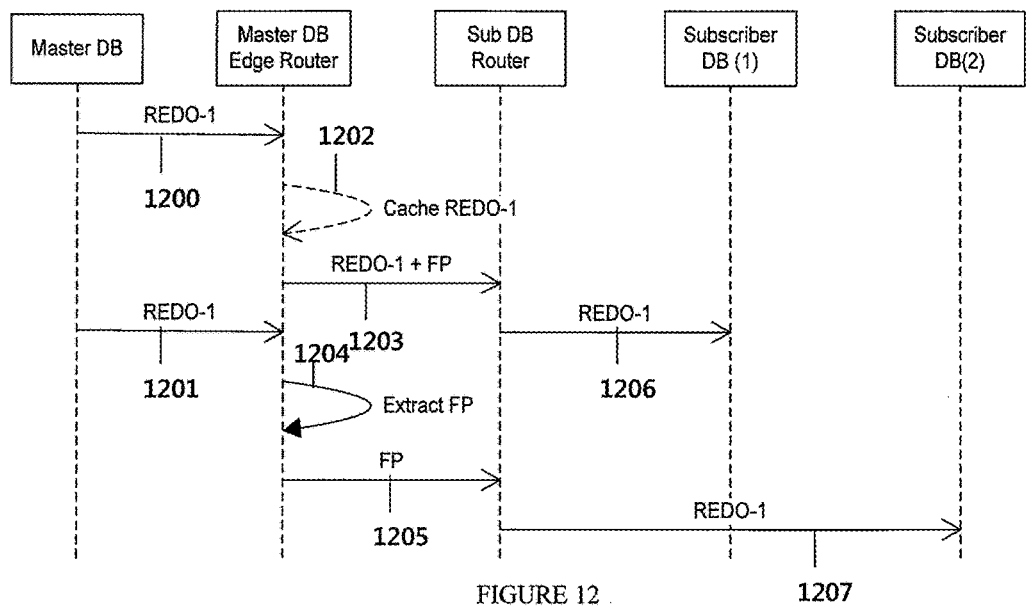
FIG. 12 illustrates a sequence Diagram for REDO caching.

FIG. 12 illustrates a corresponding sequence Diagram for optimized REDO caching as described above with reference to FIG. 11.

Now in reference to sequence diagram of FIG. 12, a Master Database (DB) sends a first REDO-1 (1200) towards Master DB Edge Router. The Master DB Edge Router in turn caches said received first REDO-1 (1202). Thereafter, Master DB Edge Router forwards the first REDO-1 along with a fingerprint towards a Subscriber DataBase (DB) Router (1203). The subscriber database router forwards the REDO-1 packet towards subscriber database (DB) (1). Meanwhile, a second REDO-1 is sent by the Master Database (DB) towards a Master DB Edge Router (1201) (as there are two subscriber databases for the Master DataBase which is unaware of underlying topology). The Master DB Edge Router in turn extracts the fingerprint (1204) and forwards the fingerprint (1205) to Subscriber DataBase (DB) Router (1205). Thereafter, subscriber database router forwards REDO-1 towards Subscriber DataBase 2 (1207).

Figure 13:
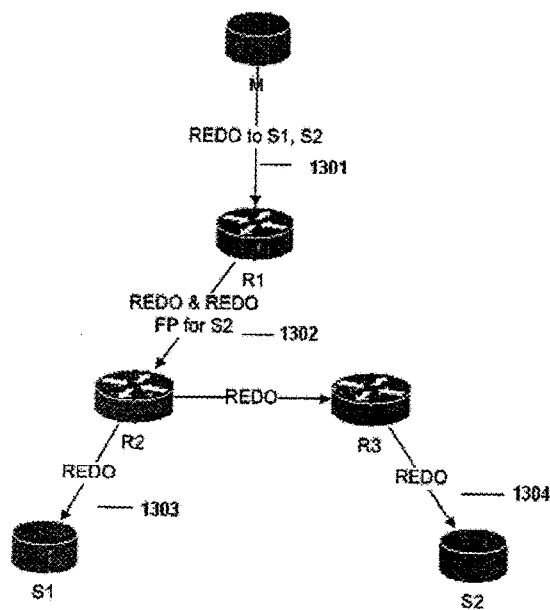
FIG. 13 illustrates an exemplary network diagram for cache based optimal routing.

FIG. 13 illustrates an exemplary network diagram for cache based optimal routing In a typical embodiment of the invention, the MDER after determining the topology of the DB (DataBase) cluster attempts to optimally use caching. If a new SDER is subscribed to the MDER and the SDER has only one subscriber, the MDER tries to find if there are any adjacent SDER which are already subscribed. If this holds true, the MDER tries to create a "switched path" for optimizing the MDER.

In the FIG. 13 a first REDO to S1 (Subscriber One) is sent through R2 (Router two). The packet is marked for caching. When the same REDO is to be sent to S2 (Subscriber Two), the fingerprint is switched to R2 (Router Two). Then R2 (Router Two) retrieves the actual data packet and forwards it to R3 (Router Three) which then forwards it to S2 (Subscriber Two).

Particularly, with reference to FIG. 13, exemplary embodiments of distributed network environment of present invention comprises of Master DataBase (M), two subscribers (S1, S2), one edge router (R1) and two subscriber routers (R2, R3).

Master DataBase (M) sends two REDO's for two of its subscribers (S1, S2) (1301). The Edge Router (R1) receives the two REDO's but sends only a fingerprint to Router 2 (R2) for subscriber Two (S2).

The Router R2 then sends a REDO for S1 (Subscriber One) and also forwards a separate REDO to (Router Three) R3. Router Three (R3) in effect forwards REDO to Subscriber Two (S2).

Figure 14:
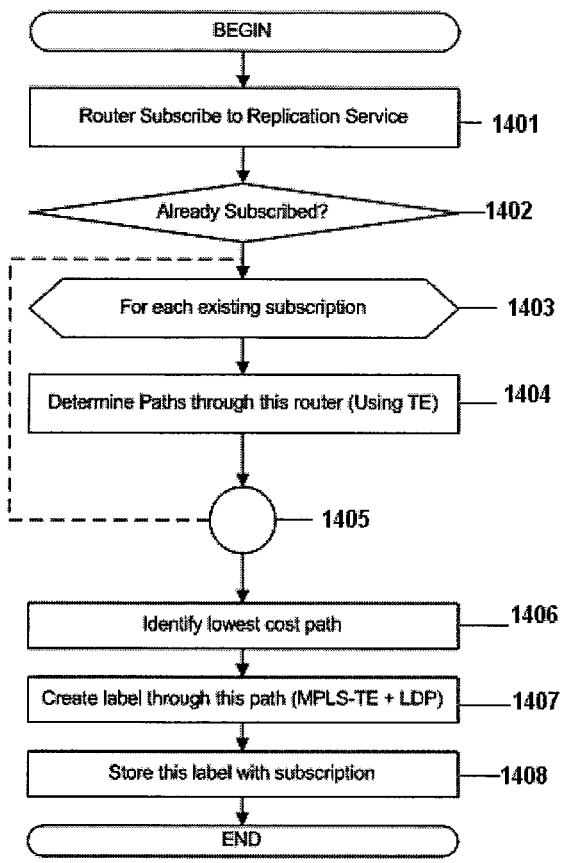
FIG. 14 illustrates Path Creation for Cache Based Optimal Routing.

FIG. 14 illustrates an exemplary path Creation for Cache Based Optimal Routing.

In this embodiment the routers are made aware of multiple kind of DB replication traffic that flows between the DB (DataBase) nodes. Each kind of traffic is considered as a channel. The data replication traffic could be routine REDO (synchronization) traffic or Initial (or complete) mirroring or priority-packet (for some kind of DDL). For each kind of traffic multiple policies are configured in the router. The router of the instant invention creates rules in the router like compression enabled, complete redundancy elimination. The MDER also creates special paths or labels to accommodate these channels. For the initial (or complete) mirroring, the router creates a path which has the maximum MTU (Maximum Transmitting Unit). Similarly for a priority channel the MDER creates another labeled path to the destination. For the priority channel the MDER never enables compression.

The mechanism for the MDER to detect the channel includes but not limited to IP+Port configuration or using DPI.

Also, DB (DataBase) nodes actively interact with the routers to offer multiple inputs so that the router can operate optimally to build the topology.

The routers are configurable to manage the streams, by implementing a configuration or management protocol like SNMP or Netconf.

Thus, essentially database node interacts with the edge router to help the edge routers determine the nature of various packets which the routers can optimize very efficiently.

Also, a database node may offer replication topology insights e.g. when the database node determines that a peer node has gone off service then it actively indicates this information to the router. This makes the database respond to the actual situation of the topology faster.

The technical scheme of the present invention advantageously eliminates such and many more disadvantages of the existing system/method that are now described herewith with reference to FIG. 4 of the present invention. FIG. 4 in essence illustrates an exemplary System Architecture of the present invention.

Thus, instant invention configures the ability of the database nodes and storage nodes to interact with the edge routers in order to offer a clear view of the "nature" of data being replicated so that the routers can optimize the data better.

On the similar lines, database nodes and storage nodes are also configured to interact with the edge routers to input the changes in the cluster topology so that the routers can make suitable adjustments.

Figure 15:
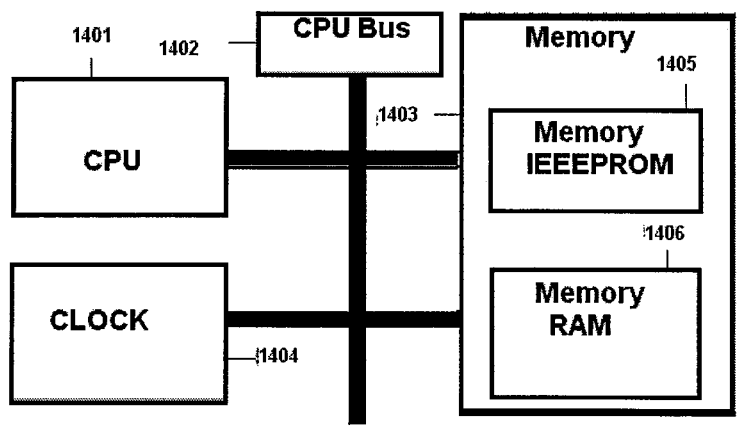
FIG. 15 illustrates a Geographically Distributed Multi-master DB Cluster.

A typical architecture of an exemplary nodes including but not limited to router(s) of the present invention is explained with reference to FIG. 15.

The CPU bus (1402) is, essentially, an interconnection wires that all subsystems are connected to. In general, only one pair of devices can talk to each other at a time, so communication of the bus must be coordinated to prevent message collisions. This coordination is often handled by the CPU (1401).

The central processing unit (CPU) (1401) executes instructions contained in memory (1403). These instructions are executed at a rate specified by the computer's clock (1404).

The CPU (1401) needs to access two different types of memory (1403) in order to execute a program. There are two types of memories used in micro-controllers. These are read-only memory (ROM) (1405) and random access memory (RAM) (1406).

In a micro-controller, read-only memory (ROM) (1406) is used to store permanent programs, operating drivers, and data. Many micro-controllers use erasable programmable read-only memory (EPROM) or electrically erasable programmable read-only memory (EEPROM) to store programs, operating drivers, and data. EPROM and EEPROM are non-volatile memories.

Random access memory or RAM (1406) is used to temporarily store data and instructions.

The relevant components of ROUTER(s) and DataBase Nodes (404) of the present invention selectively comprise of:

Signal control unit (not shown):

Device: Mainly comprising of CPU+software in memory+rf section, for controlling the bandwidth usage in device.

Service provider network: Mainly comprising of server+software in memory+rf section, for controlling the bandwidth usage in network.

Memory Unit:

Device: Mainly comprising of memory, for storing software+data associated with one or more services/tasks/operations as transceived by the said signal control unit.

Service provider network: Mainly comprising of memory, for storing software+data associated with one or more services/tasks/operations as transceived by the said signal control unit Signal Processing Unit:

Device: Mainly comprising of CPU+software in memory+speaker, for processing short switching trigger data pulse signal to accomplish the operations by performing output to the speaker after recalling the corresponding service memory from device and confirm to network provider/operator.

Service provider network: Mainly comprising of server+software in memory, for processing short switching trigger data pulse signal to accomplish the operations by transceiving to device and confirmation from device.

What is claimed is:

1. A method for optimizing replication in a distributed network configured for hosting and communicating among plurality of data packets and a database server, the method comprising:

determining existing cluster topology of the network by a router operating in the network;

identifying and optimizing a data replication stream in use in the network by the router;

determining a routing scheme based on the cluster topology by the router;

routing data packets through the network based on the routing scheme; and applying a predefined policy to at least one predefined router corresponding to an identified data replication stream by the router, wherein the router comprises at least one edge router and an edge router operating closest to the database server is a database node edge router, and wherein a master edge router optimizes data replication stream by enabling caching on the at least one edge router and attaching a fingerprint to a payload associated with the cache.

2. The method as claimed in claim 1, wherein the database node edge router includes configured data comprising:

an Internet Protocol address of the database node edge router;

a database cluster unique identifier; and channel and associated policy configurations.

3. The method as claimed in claim 1, wherein routing data packets comprises:

creating a path along with a label by a first router for routing a data packet to a third router using cached data of a second router;

determining by the first router that a data packet to be transmitted to the third router is cached in the second router and using a cached finger print along with the path label; and receiving by the second router the fingerprint with corresponding label, processing the received packet data, converting the packet data with actual data and forwarding the actual data towards third router.

4. The method as claimed in claim 1, further comprising:

advertising/publishing the identified data replication stream by the at least one edge router in the network;

receiving and storing the advertised/published information by a database-aware router;

subscribing to a master database edge router by the database-aware router;

adding the database-aware router in a cluster as a SDER (Subscription Database Edge Router) after subscription;

configuring the corresponding SDER for each added database-aware router; and wherein the master database edge router (MDER) on receiving a subscription request is configured for:

checking if requesting database-aware router or SDER is already subscribed, and enabling caching on MDER-SDER link after determining that requesting database-aware router or SDER is already subscribed.

5. The method as claimed in claim 1, further comprising:

sending REDO log information as a data packet to a subscriber node by its corresponding master DB node;

intercepting the packet data by a MDER (master database edge router) for determining REDO log information;

caching the packet data after determining that it contains REDO log information and that cache is not already enabled.

6. The method as claimed in claim 5, further comprising:

extracting destination address of a data packet by the master database edge router via a lookup edge router information;

generating a finger print for the packet data for a cache enabled edge router, and storing the fingerprint;

labeling the data packet and forwarding the fingerprint; and generating a label by the master database edge router for the packet data and forwarding only the finger print when it is determined that a fingerprint already exists.

7. The method as claimed in claim 1, wherein a master database edge router based on a determined topology of a DB cluster exhibits an optimal utilization of caching.

8. A system for optimizing replication in a distributed computer network configured for hosting and communicating among plurality of data packets and a database server, the system comprising:
 one or more hardware data routers operating in the computer network and configured to:
  determine existing cluster topology of the computer network;
  identify and optimize a data replication stream in use in the computer network;
  determine a routing scheme based on the cluster topology;
  routing data packets through the computer network based on the routing scheme; and
  apply a predefined policy to at least one predefined router corresponding to an identified data replication stream,
 wherein the one or more hardware data routers determines existing cluster topology of the computer network and comprises at least one edge router, and an edge router operating closest to the database server is a database node edge router, and
 wherein a master edge router optimizes data replication stream by enabling caching at least one of the one or more hardware data routers and attaching a fingerprint to a payload associated with the cache.

9. The system as claimed in claim 8, wherein the database node edge router includes configured data comprising:
 an Internet Protocol Address of the database node edge router;
 a Data base cluster unique identifier; and
 channel and associated policy configurations.

10. The system as claimed in claim 8 wherein the system is configured to:
 create a path along with a label using a first router to route a data packet to a third router using cached data of a second router;
 determine via the first router that a data packet to be transmitted to the third router is cached in the second router and using a cached fingerprint along with the path label;
 receive by the second router the fingerprint with corresponding label, process the received packet data, convert the packet data with actual data and forward the actual data towards third router.

11. The system as claimed in claim 8, wherein a corresponding master DB node is configured to:
 send REDO log information as a data packet to a subscriber node;
 intercept the packet data by a MDER (master database edge router) to determine REDO log information; and
 cache the packet data after determining that it contains REDO log information and that cache is not already enabled.

12. The system as claimed in claim 11, wherein system is further configured to:
 extract destination address of a data packet by the master database edge router via a lookup edge router information;
 generate a fingerprint for the packet data for a cache enabled edge router and store the fingerprint;
 label the data packet and forward the fingerprint; and
 generate a label by the master database edge router for the packet data and forward only the fingerprint when it is determined that a fingerprint already exists.

13. The system as claimed in claim 8 wherein a master database edge router based on a determined topology of a DB cluster exhibits an optimal utilization of caching.

* * * * *